United States Patent [19]

Zamora

[11] Patent Number: 4,666,192
[45] Date of Patent: May 19, 1987

[54] COUPLING DEVICE WITH HINGED RETAINING CATCHES

[75] Inventor: Pedro C. Zamora, Barcelona, Spain

[73] Assignee: Sociedad Anonima de Industrias Piasticas (S.A.I.P.), Barcelona, Spain

[21] Appl. No.: 847,141

[22] Filed: Apr. 2, 1986

Related U.S. Application Data

[63] Continuation of Ser. No. 635,237, Jul. 27, 1984, abandoned.

[30] Foreign Application Priority Data

Aug. 5, 1983 [ES] Spain ............................ 274252[U]

[51] Int. Cl.[4] ............................................. F16L 21/06
[52] U.S. Cl. .................................. 285/322; 285/257; 285/319; 285/918
[58] Field of Search ............... 285/319, 322, 323, 257, 285/918, 925

[56] References Cited

U.S. PATENT DOCUMENTS

| | | | |
|---|---|---|---|
| 2,171,217 | 8/1939 | Kreidel | 285/DIG. 17 X |
| 3,250,551 | 5/1966 | Draudt | 285/319 X |
| 3,394,950 | 7/1968 | Jensen | 285/322 X |
| 3,754,781 | 8/1973 | Conroy | 285/322 |
| 4,145,075 | 3/1979 | Holzmann | 285/322 X |
| 4,248,459 | 2/1981 | Pate et al. | 285/322 X |
| 4,266,814 | 5/1981 | Gallagher | 285/319 |
| 4,328,979 | 5/1982 | Stoll | 285/322 X |

Primary Examiner—Richard J. Scanlan, Jr.
Attorney, Agent, or Firm—Cushman, Darby & Cushman

[57] ABSTRACT

A coupling device for tubes includes first and second concentric cylindrical parts, the inner one of which has at one end thereof, a plurality of hinged arcuate clamping catches having retaining teeth on the inner faces thereof, the hinges for each of the clamping catches being resilient and functioning to urge the clamping catches outwardly away from the longitudinal axis of the inner member.

4 Claims, 5 Drawing Figures

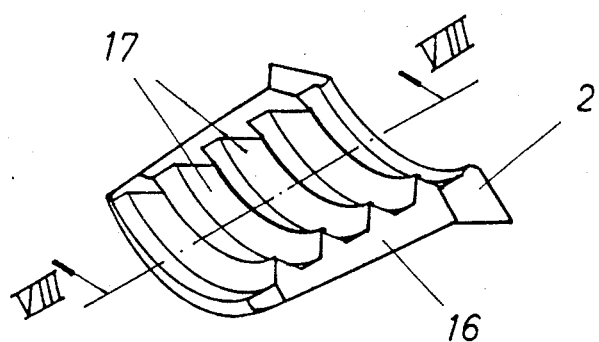
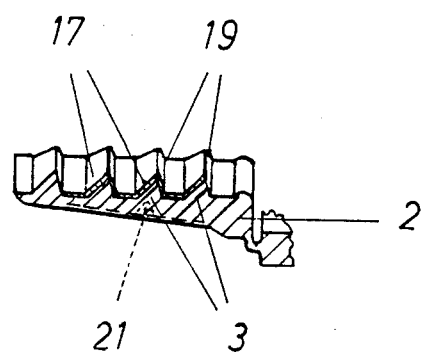
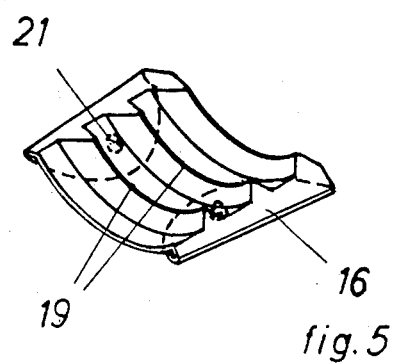
fig. 5

COUPLING DEVICE WITH HINGED RETAINING CATCHES

This is a continuation of application Ser. No. 635,237, filed July 27, 1984, which was abandoned upon the filing hereof.

BACKGROUND AND SUMMARY OF THE INVENTION

This application refers to a coupling device with hinged retaining catches which is especially useful for coupling together tubes made of any material, including metal.

Many tube-coupling or connecting devices are known which consist basically of two or more concentric elements that can be screwed together, the tightening up of which leads to the retention of the end of the tubular body that is to be joined on. However, these devices, besides not generally offering enough of a guarantee as regards the holding of the smooth end of the joined tube, show certain deficiencies concerning the making of such a connection.

The device which is the object of this application differs from those previously known both in the simplicity of its design and the ease and efficiency with which the connection can be made, the hold being assured by means of swivel catches hinged peripherally to the front of the inner body, these catches having a tendency to open but which will close up gradually when being screwed on, with the possibility of these catches being fitted with an additional, non-slip hardfacing to ensure retention of the end of the tube that has to be connected, even when the latter is made of very rigid material, including metal.

In accordance with the above, an inherent characteristic of the new idea proposed is that, with the coupling device being msde up of two basic concentric parts which can be screwed together, besides the usual O-ring seal, the part constituting the inner body presents, from the front, a varying number of peripheral hinged catches which will depend on said inner body, these having been obtained preferably by means of moulding of thermoplastic materials, the peripheral catches being joined in relation to the inner body of the connection, by means of the respective hinge formed by a thinning down of the actual material, with the possibility of swivelling open or closed opposite the opening to the inner body of the connection, but with a permanent tendency to open in order to facilitate entry of the end of the tube to be connected.

These catches, with a tendency to open, will be housed inside the outer body of the connection such that the screwing on of this outer body will cause them to close up gradually, in the same way as the unscrewing of said body will allow the catches to open slightly thanks to their constant tendency to swivel apart from each other, an opening effect towards which the elastic O-ring behind the catches will be able to collaborate.

Another characteristic worth emphasising and which is related to the above concerns the screwing together of the two basic concentric parts, which will initially require overcoming a ring-shaped retaining ridge fitted on the inner body and shaped to facilitate this initial operation but which will later serve as a stop for marking the appropriate limits for screwing and unscrewing so that, by unscrewing until the stop comes into play, without separating the two parts of the device, it will be easy to introduce the end of the tube to be connected, which will be received by the fixing catches in a suitably open position, while by screwing up until the opposite stop acts equally, the catches will gain a secure hold on the end of the connected tube.

In order to guarantee this hold, the hinged retaining catches, usually of moulded thermoplastic material, may be fitted with a non-slip hardfacing made up of super-imposed metal parts adjusted to the toothing of the catch, said parts having sharp retaining edges which will act on the connected tube preventing it from slipping all the time the device is kept screwed together.

BRIEF DESCRIPTION OF THE DRAWINGS

The enclosed drawings illustrate, as a non-limited example, a way of carrying out the new coupling device, showing:

FIGS. 4 and 5, both showing different representations of the non-slip hardfacing applicable to the hinged catches.

DETAILED DESCRIPTION OF THE INVENTION

Figure 1:
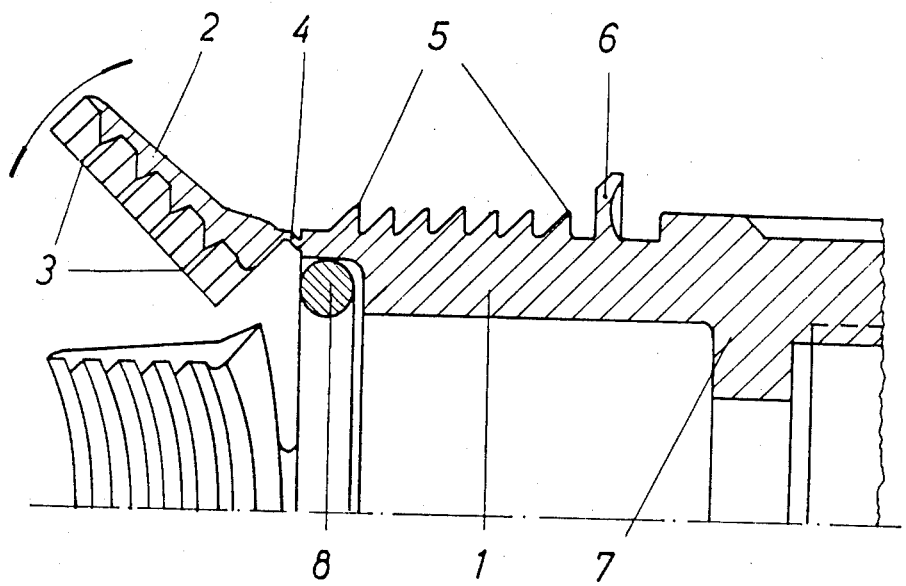
FIG. 1, a cross-section of the inner body and one of the catches hinged to same.

In accordance with what is shown in the aforementioned drawings, the inner body 1 of the coupling extends frontally by means of some clamping catches 2 equipped internally with a retaining toothing 3, these catches 2 being joined peripherally to the inner body 1 by means of some hinges 4 which are integrated owing to the thinning of the actual material of the unit's assembly in this case, with the possibility of swivelling in the direction of the double arrow but with a constant tendency of the catches to separate or open with regard to the longitudinal axis of the inner body 1.

This inner body 1 will be provided, externally, with a threaded area 5, after which comes a peripheral ring-shaped ridge 6, shaped to allow it to be overcome initially by forcing the relative elasticity of the material.

Aside from the particular characteristics noted, the inner body 1 itself will be equipped with a penetration stop 7 which will limit the feed-in of the tube inserted for coupling purposes, which will be surrounded by the usual sealing O-ring 8, held by the hinged catches 2 when they close.

Figure 2:
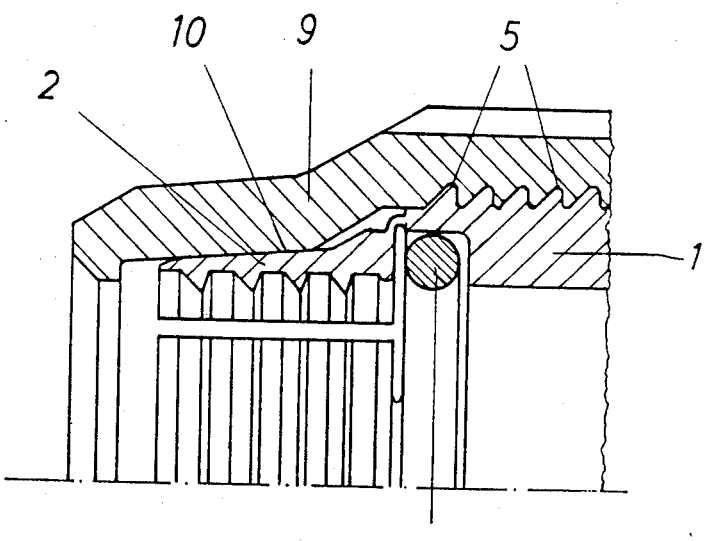
FIG. 2, a cross-section of the front of the inner body, with the catches closed owing to adjustment of the outer body of the coupling.

The maximum closing position of these clamping catches 2 is shown in FIG. 2, with them surrounded by outer body 9 whose screw-on penetration into area 5 of the inner body 1 will lead to the gradual closing of the hinged catches 2 owing to the sliding motion that strangles the internal tapered section 10 of the outer body 9. With the hinged clamping catches 2 thus closed, the sealing ring 8 will be securely held in its active position.

Figure 3:
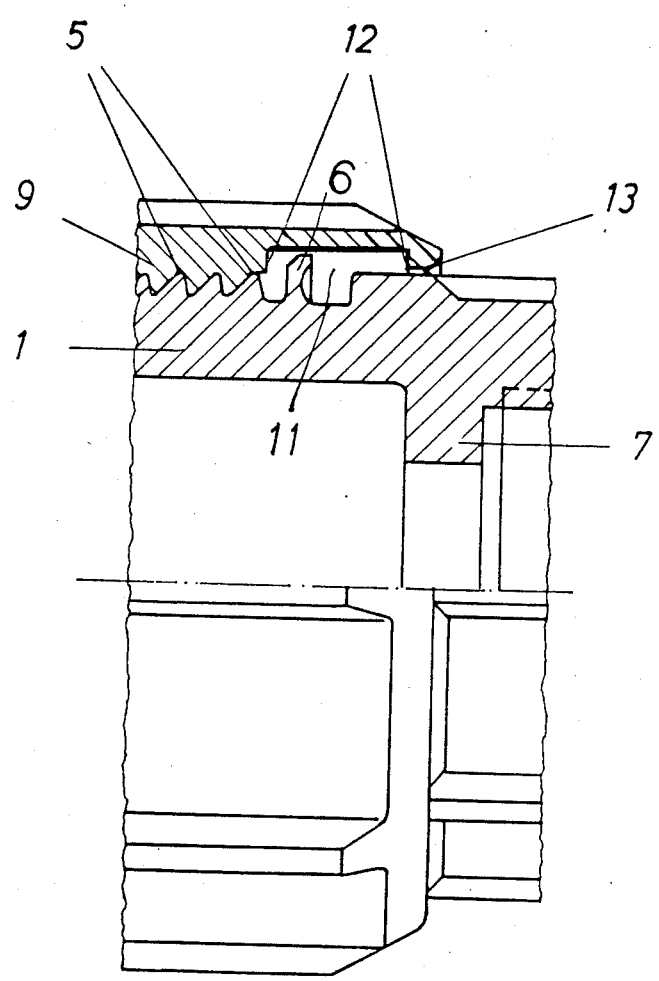
FIG. 3, a cross-section of the reciprocal retention zone of the two parts of the device.

The retention exerted by the outer body 9 on the inner body 1 is illustrated in FIG. 3 which shows a cross-section of the back end of the outer body 9, with its circular inner cavity 11 limited by two straight walls 12 shaped to fit the stopping peripheral ring-shaped ridge 6 of the inner body 1. Because of the inclination of the outer edge 13 of the outer body 9, when this outer body 9 is initially screwed on to the threaded area 5 of the inner body 1, the obstacle comprising the ring-shaped ridge will be forced, also because of its own inclination. However, afterwards, once the initial obstacle has been overcome and the retention ridge 6 is located inside cavity 11, the internal straight walls 12 of this cavity will act as stops on the shifting of the outer body 9 in its screwing-on and unscrewing on the external area 5 of the inner body 1, so that, by unscrewing as far as the stop, the clamping catches 2 will open to receive or release the end of the tube being connected, while by screwing up to the maximum opposite stop, the catches 2 will close, thereby retaining the end of the tube that has been inserted into the coupling device.

This way, without the need for any further manipulation, the respective tube end can be coupled or uncoupled extremely easily and efficiently, with no danger of faulty threads, penetration of dirt or foreign bodies, etc., as so frequently happens with other kinds of devices.

Figure 4:
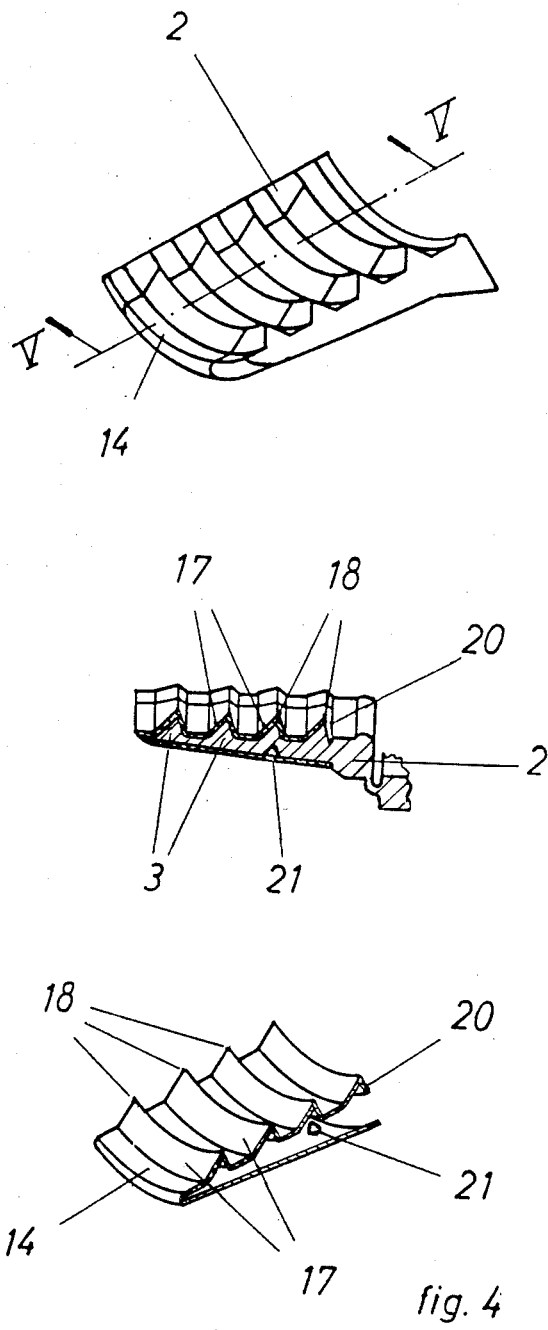

Finally, in order to ensure the retaining power of the hinged clamping catches 2, these may be fitted with a special hardfacing, as shown in FIGS. 4 and 5.

This hardfacing comprises a metal part in the form of a clamp or spring which is inserted and holds itself in place on the retaining toothing 3 of said catches 2, either placed as a frontal clamp 14 or as a cross bracket 16. As these hardfacing elements have some folds 17 in them which adjust to the toothing 3 of the catches 2, the edge 18 of these folds of the metal part will accentuate the actual retention power of the catch which is usually of a less rigid material such as plastic. If, moreover, said edges are sharp, 19, the retention effect will be so high as to ensure the coupling even of ends of metal tubing.

The hardfacing will hold itself in place owing to its shape which is adjusted to that of the catch 2 to be covered and particularly to the toothing 3 of same, although there is the possibility of using top elements 20 which can be nailed to the actual material of the catch 2 or even some sort of fastening protrusions 21.

What has been described and explained above may vary in the details of its execution, in the alternative use of some or other solutions or in the substitution of certain means by other equivalent ones which do not alter the essential nature of the device claimed.

I claim:

1. A coupling device comprising:
a first coupling portion including:
   (a) inner surfaces which define an internal, hollow cavity;
   (b) external surfaces which define a threaded external area over at least a portion of said first coupling portion, and
   (c) ring shaped ridge means, extending around a circumference of said first coupling portion and extending away from said first coupling portion by a distance greater than that of any other structures which extend away from said first coupling portion, said ring shaped ridge means including a first stop surface, a second stop surface on an opposite side of said ridge means from said first stop surface, and an inclination surface;

a plurality of clamping catch assemblies, each assembly including:
   (a) clamping catch which includes a sloping outer surface; and
   (b) hinge means for hingedly coupling said clamping catch to said first coupling portion; and second coupling means for coupling to said first coupling portion in order to selectively maintain said clamping catch in one of a closed and an opened position depending on a position of said second coupling means on said first coupling portion, said second coupling means including:
   (a) threaded internal surface means, adapted for coupling with said threaded external area of said first coupling portion, for fixedly mounting said second coupling means to said first coupling portion at different locations along a peripheral extent of said first coupling portion;
   (b) sloping surface means for mating with said sloping outer surface of said clamping catch assembly when said threaded internal surface means is fixedly mounted to said first coupling portion at a location beyond a first predetermined boundary, thereby holding all of said plurality of clamping catch assemblies in a closed position;
   (c) inner cavity surface means for defining an inner cavity, including first stop surface means for mating with said first stop surface of said ring shaped ridge means when said second coupling means reaches a second predetermined boundary to terminate a peripheral movement of said second coupling means relative to said first coupling portion, second stop surface means for mating with said second stop surface of said ring shaped ridge means when said second coupling means reaches a third predetermined boundary relative to said first coupling portion, said inner cavity surface means also for limiting a relative motion between said first coupling portion and said second coupling means to be between said second and third predetermined boundaries by the interaction of said inner cavity surface means and said ring shaped ridge means; and
   (d) an outer edge portion, located on an opposite side of said inner cavity surface means from said sloping surface, including outer edge surface means for allowing said outer edge to pass over said ring shaped ridge means.

2. A device as in claim 1 wherein said outer edge surface means includes an inclined surface so that said outer edge can be temporarily deformed in order to traverse said ring shaped ridge means.

3. A coupling device as in claim 1 wherein said clamping catches are formed with retaining toothing on an inner surface thereof.

4. A coupling device as in claim 1 wherein each said catch is formed with retention teeth provided with a metal facing shaped to compliment the shape of said teeth, said metal facing having sharpened outer edges to facilitate gripping of a member coupled by said coupling device.

* * * * *